G. CALVIGNAC.
PRESSED STEEL FRAME FOR MOTOR CYCLES AND LIKE VEHICLES.
APPLICATION FILED MAY 3, 1922.
1,430,938.
Patented Oct. 3, 1922.
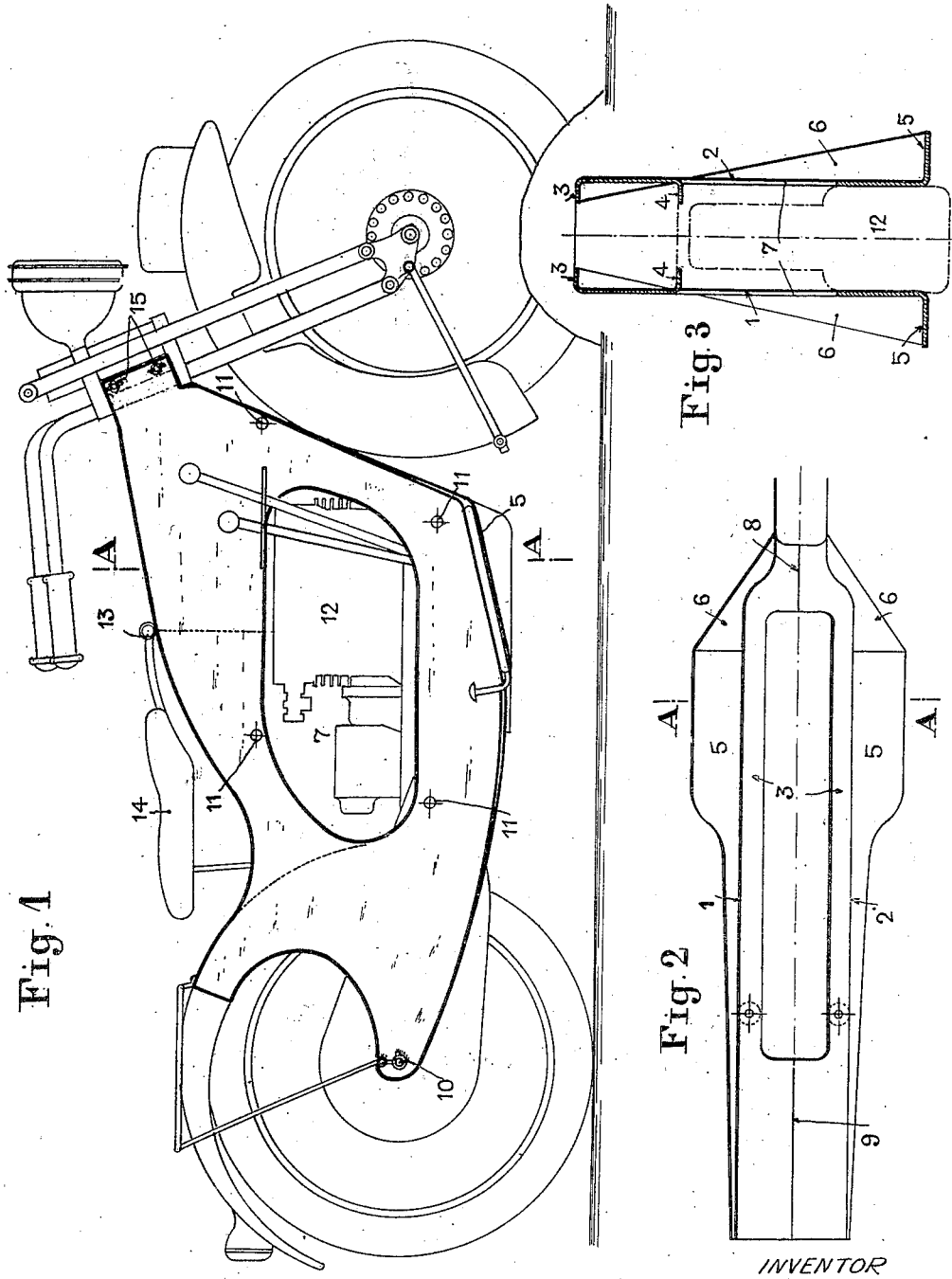
INVENTOR
Germain Calvignac
BY
ATTORNEYS Patented Oct. 3, 1922.

1,430,938

UNITED STATES PATENT OFFICE.

GERMAIN CALVIGNAC, OF LEVALLOIS-PERRET, FRANCE.

PRESSED-STEEL FRAME FOR MOTOR CYCLES AND LIKE VEHICLES.

Application filed May 3, 1922. Serial No. 558,240.

*To all whom it may concern:*

Be it known that I, GERMAIN CALVIGNAC, a citizen of the French Republic, and residing in Levallois-Perret, Seine, France, 49 Rue Lannois, have invented certain new and useful Improvements in and Relating to Pressed-Steel Frames for Motor Cycles and like Vehicles, of which the following is a complete specification.

This invention relates to motor cycles and like vehicles, and it has more particularly for its object to provide a frame made of pressed steel, the said frame being constituted by two symmetrical plates which are conveniently connected with each other, so as to obtain a rigid resisting structure, the same being conveniently shaped so as to receive the motor and its accessories.

A constructional example of the frame according to the invention is shown in the accompanying drawings in which:

Fig. 1 is a side elevation of a motor cycle provided with the frame according to the invention, Fig. 2 is a plan of the frame alone, Fig. 3 is a cross-section through line A—A of Figs. 1 and 2.

The frame is constituted by two symmetrical plates 1, 2, connected with each other in any convenient way, as for instance by means of bolts, so as to give a structure of a great resistance and rigidity.

Each plate is made of a sheet of for instance laminated steel, which is pressed preferably with a hydraulic press, so as to possess, in the upper part of the frame, two wings 3, 4, the reunion of which forms a casing surrounding the fuel tank, together with the tool box, the latter being not shown on the drawing. The lower part of each plate is turned outwardly, as shown by 5, thus forming resting surfaces for the feet, the said surfaces being connected with the front part of the frame through inclined wings 6 which form protecting surfaces for the legs of the cyclist.

Both plates are apertured as in 7 (Fig. 1) and they are connected together along the middle line 8–9 (Fig. 2), the connection of the said plates being effected on the one hand by the axle 10 of the rear wheel, and on the other hand by the carrying part of the steering device, and by bolts 11 conveniently located on the surface of the frame.

The front part of the frame receives the steering tube of the motor-cycle which is kept in position by bolts 15 and constitutes the front transom of the frame.

The motor 12 is located with all its connected parts inside the frame where it is secured by means of bolts or of any other convenient devices, and a pivot 13 (Fig. 1) is provided on the upper part of the frame for the pivoted connection of the front saddle-carrier 14, the suspension of which is effected by means of convenient springs not shown in the drawing, in a casing of the frame.

The described arrangement permits of obtaining a frame with a great rigidity, which is able to carry a powerful motor, the same being located and secured between the lower parts of the two plates 1, 2, as shown in Figs. 1 and 3, thus reducing the chances of bad operation, owing to the perfect binding thus obtained between the motor and its carrying part.

The opening 7 renders access to the motor and its parts very easy. The arrangement of the plates enabling the same to be obtained with only one press operation and then connected by means of bolts gives a structure of very economical manufacture, which, however is able to resist all the strains it has to bear. The arrangement of the lateral wings which reinforce laterally the plates give a support and a protection for the legs of the cyclist, whose feet may rest upon the surfaces 5.

The frame may be made of any convenient metal, laminated steel aluminium or other metal. The thickness of the said laminated metal may vary according to the power of the machine, as well as the number of bolts.

What I claim is:

1. A frame for motor cycles, comprising a metal casing formed of two plates secured together, said casing having in its upper part opposing and inwardly extending wings forming supports for a fuel tank, the lower ends of the sides of the casing being bent outwardly to form foot-rests connected with the forward part of the casing by inclined wings which serve to protect the legs of the cyclist.

2. A frame for motor cycles comprising a metal casing formed of two plates secured together, said plates having opposing and inwardly extending wings at their upper ends, and opposing and inwardly extending wings below said first-named wings, said lower wings adapted to support the fuel tank, and with the upper wings provide a housing for said tank, said plates enclosing a space and providing surfaces for the support of the power mechanism, and said plates being apertured to afford access to the power mechanism.

In testimony I have hereunto set my hand at Paris, France, this 14th day of April, 1922.

GERMAIN CALVIGNAC.